Jan. 26, 1971  L. MORTON, JR., ET AL  3,557,520
METHODS AND APPARATUS FOR MANUFACTURING DISPENSING DEVICES
Filed Nov. 12, 1968  5 Sheets-Sheet 1
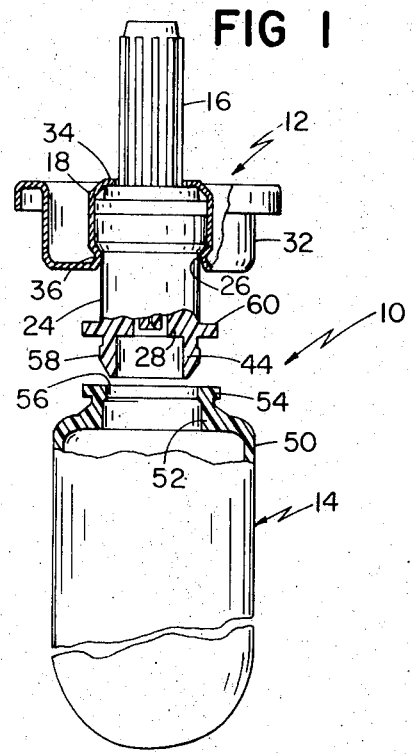
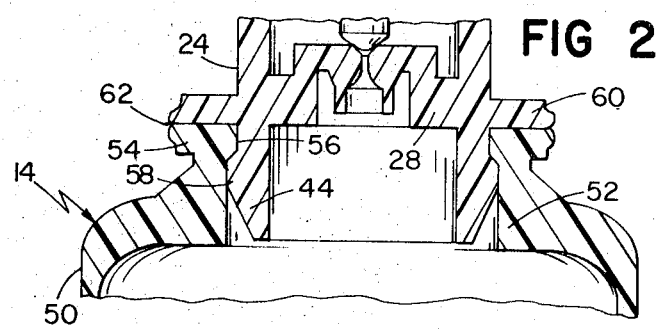
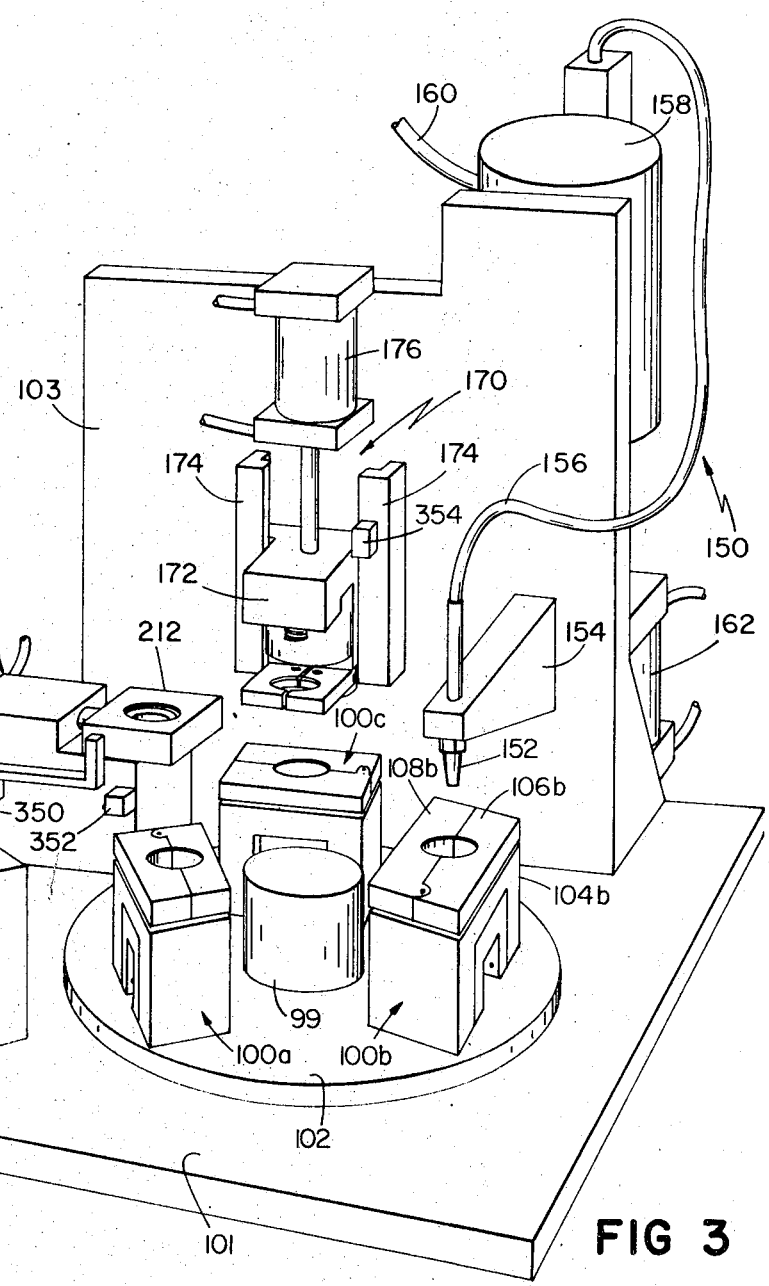

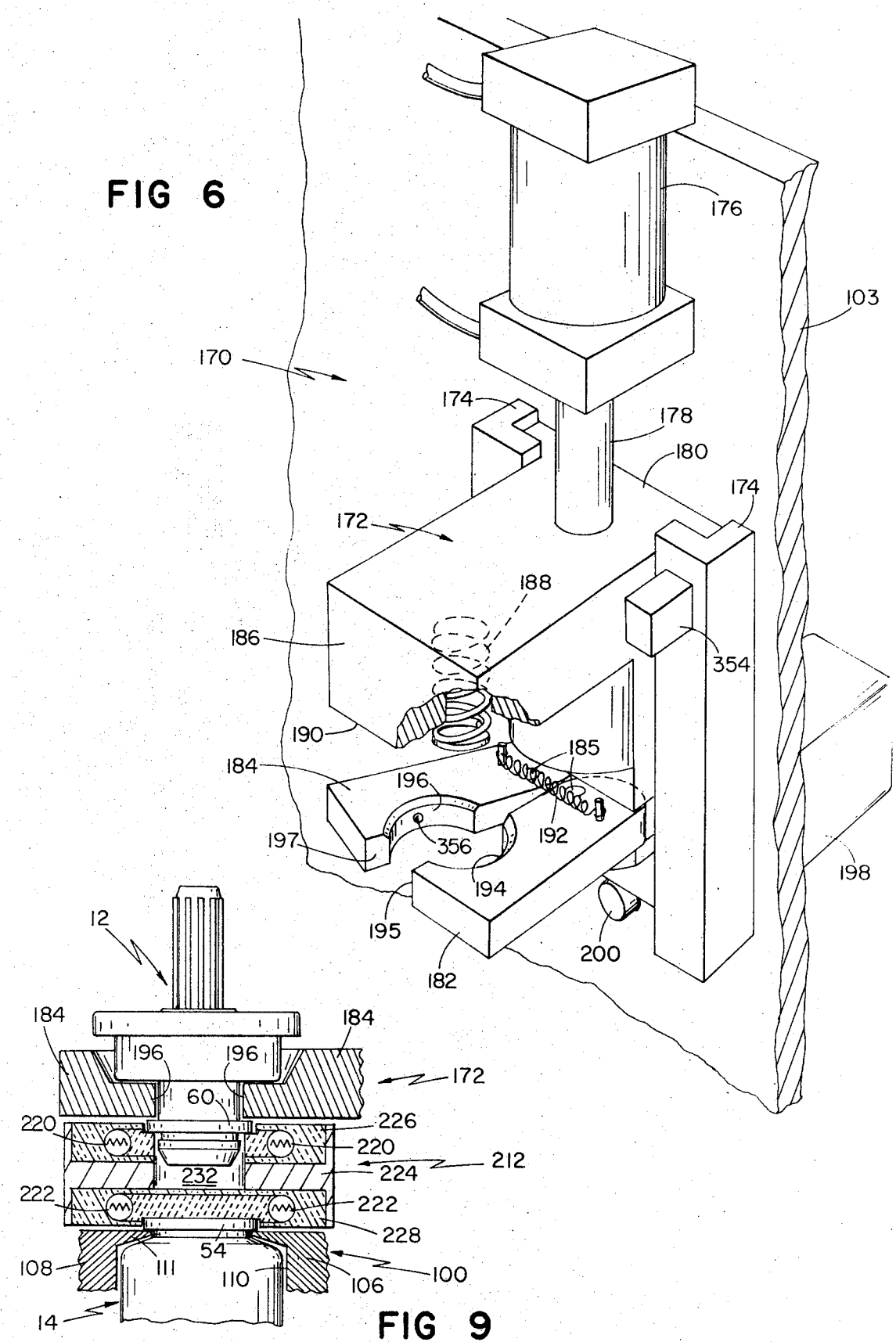

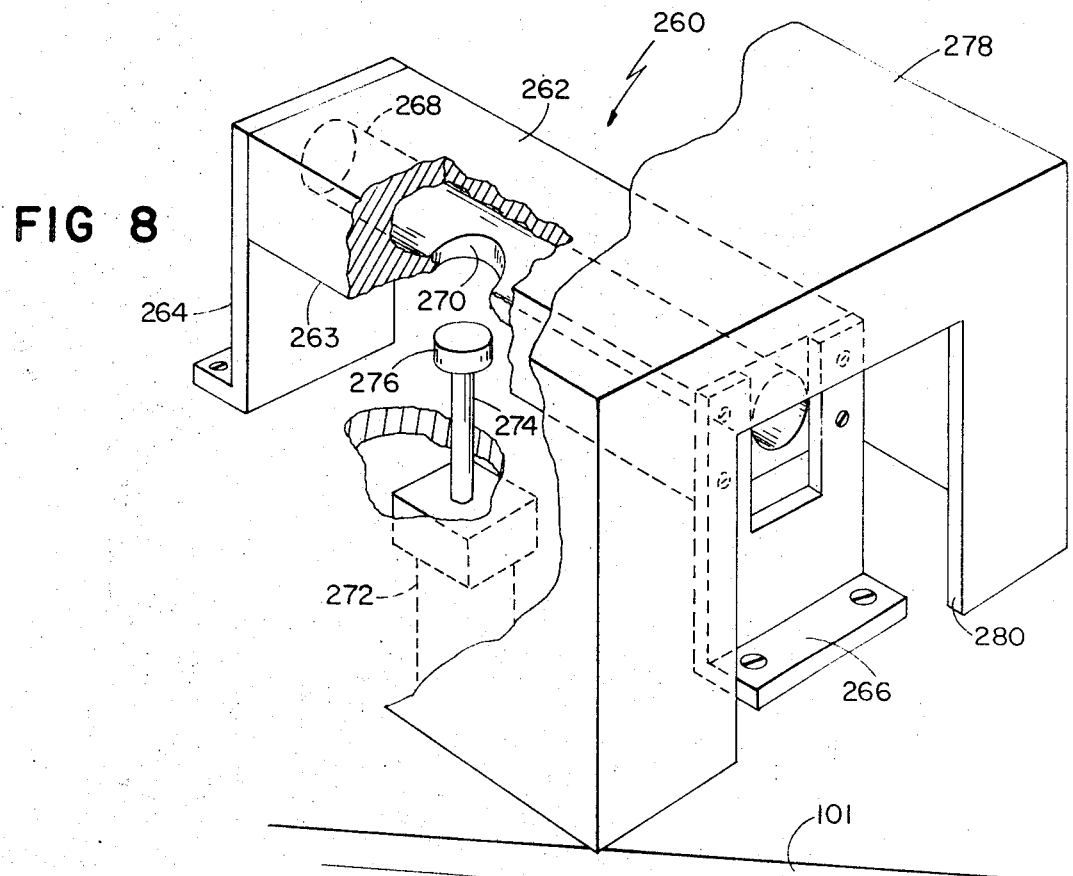
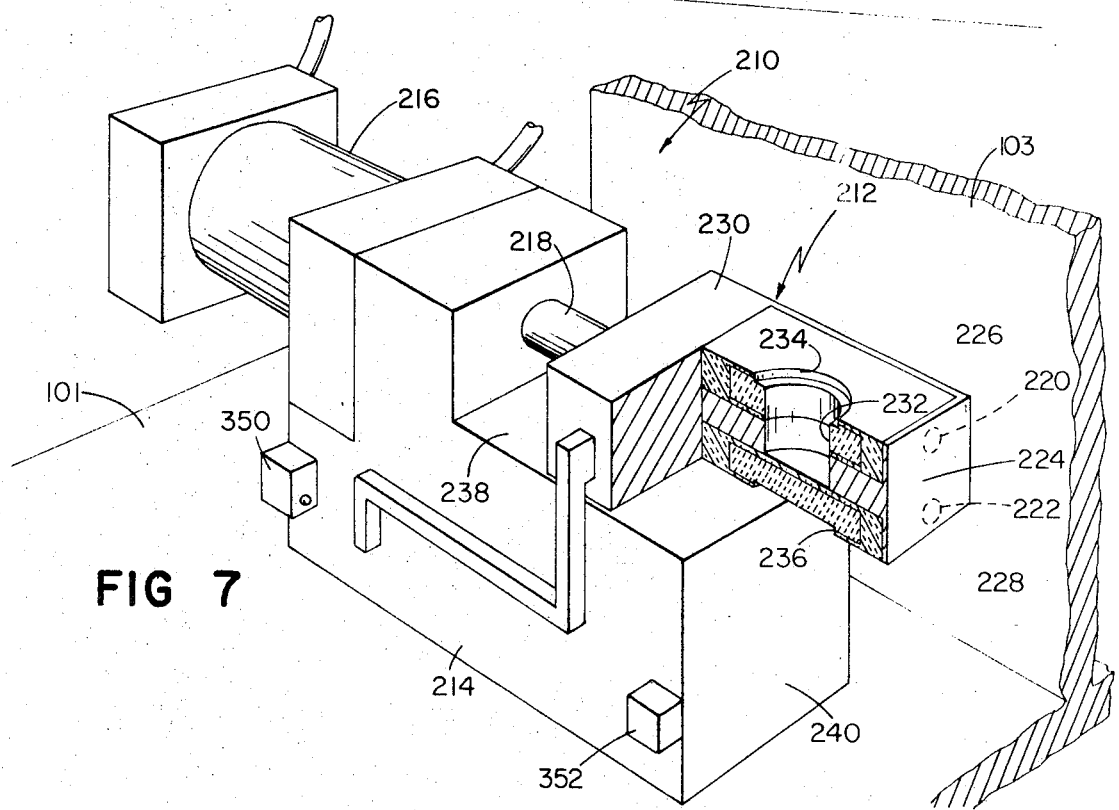

United States Patent Office 3,557,520
Patented Jan. 26, 1971

---

3,557,520
METHODS AND APPARATUS FOR MANU-FACTURING DISPENSING DEVICES
Lloyd Morton, Jr., Chelmsford, and John O'Hare, Needham, Mass., assignors to The Gillette Company, Boston, Mass., a corporation of Delaware
Filed Nov. 12, 1968, Ser. No. 774,964
Int. Cl. B65b 3/12, 7/28
U.S. Cl. 53—37
21 Claims

ABSTRACT OF THE DISCLOSURE

Apparatus for filling a polyethylene inner container and securing that filled container to a valve assembly includes a turntable having three bottle holders on it, which holders are movable in sequence past a filling station and an assembly station. At the assembly station there is provided a holder for a valve assembly and a heater which is movable between the bottle and the valve assembly to appropriately heat two opposed surfaces. The heater is then removed and the two heated surfaces are moved together to provide a seal which forms a bead as some of the plastic material is displaced radially during the filling operation.

SUMMARY OF INVENTION

This invention relates to methods and apparatus for assembling and testing aerosol-type pressurized dispensing device assemblies.

Frequently it is desired to dispense a product that results from mixing, at the time of dispensing, of two or more different ingredients that are stored separately from each other so that those ingredients will maintain their effective properties for an indefinite period of time during storage. A variety of products may be usefully so dispensed, an example being a two part self-heating cosmetic composition to be applied to the human skin, one part containing a reducing agent and the other containing an oxidizing agent reactive with the reducing agent to liberate heat.

In dispensing devices of the pressurized type which employ separate ingredients, one of the ingredients is often stored in a flexible walled inner container disposed within a larger container containing a second ingredient. Such inner containers are filled and sealed to a valve assembly before the final assembly of dispensing device. It is important that the seal be secure, both for safety and reliability in storage and to preclude intermixing of the ingredients before discharge. The flexibility of the container creates handling problems especially when the container is full and before and during assembly and/or sealing.

Accordingly, it is a primary object of the present invention to provide a method for suporting, filling and assembling container-valve assembly units and apparatus that is especially adapted and designed for producing filled and completely assembled container valve assembly units in large quantities and in a manner that minimizes cost. Other objects include providing apparatus for sequentially filling, assembling, and sealing inner containers, securely supporting the full and flexible-walled container throughout the sequential operations, forming seals of high quality; and subsequently testing the sealed container.

The invention features, in its method aspect, supporting a container and valve assembly in juxtaposed, spaced positions, heating annular sealing surfaces of the container and valve assembly, and moving the flanges into engagement to provide a reliable seal; and, in its apparatus aspect, support structures for engaging and supporting the container and valve assembly, and a heater for appropriately heating the two sealing surfaces, the support structures being movable towards and away from each other and the heater being movable between and away from the support structures; and a control circuit for sequentially moving the heater between the support structures, moving the structures toward the heater to heat the seal surfaces, moving the heater away from the structures, and moving the structures together to force the heated surfaces into sealing engagement. In preferred embodiments flange surfaces are moved together until the sealed thickness of the two surfaces is at least a predetermined amount less than the sum of the thicknesses of the flanges before heating; the flanges are heated at different temperatures but for the same period of time; a plurality of bottle support structures are provided so that one bottle is filled while a second is being sealed and a third is removed and replaced by an empty bottle; and control circuitry for advancing the three support structures from a loading-replacement station to a filling station, to a sealing station and, finally, back to the loading-replacement station while controlling the filling and assembling-sealing operations.

Other objects, features and advantages of the invention will be seen as the following description of a particular embodiment thereof progresses, in conjunction with the attached drawings in which:

FIG. 1 is a plan view, partially in section of an inner container of the invention;

FIG. 2 is a plan sectional view of a portion of the container of FIG. 1;

FIG. 3 is a perspective view of apparatus for assembling the container of FIG. 1;

FIGS. 4–8 are perspective views of portions of the apparatus of FIG. 3;

FIG. 9 is a sectional view of the valve assembly and container with the heater interposed.

DESCRIPTION OF PARTICULAR EMBODIMENT

Figure 4:
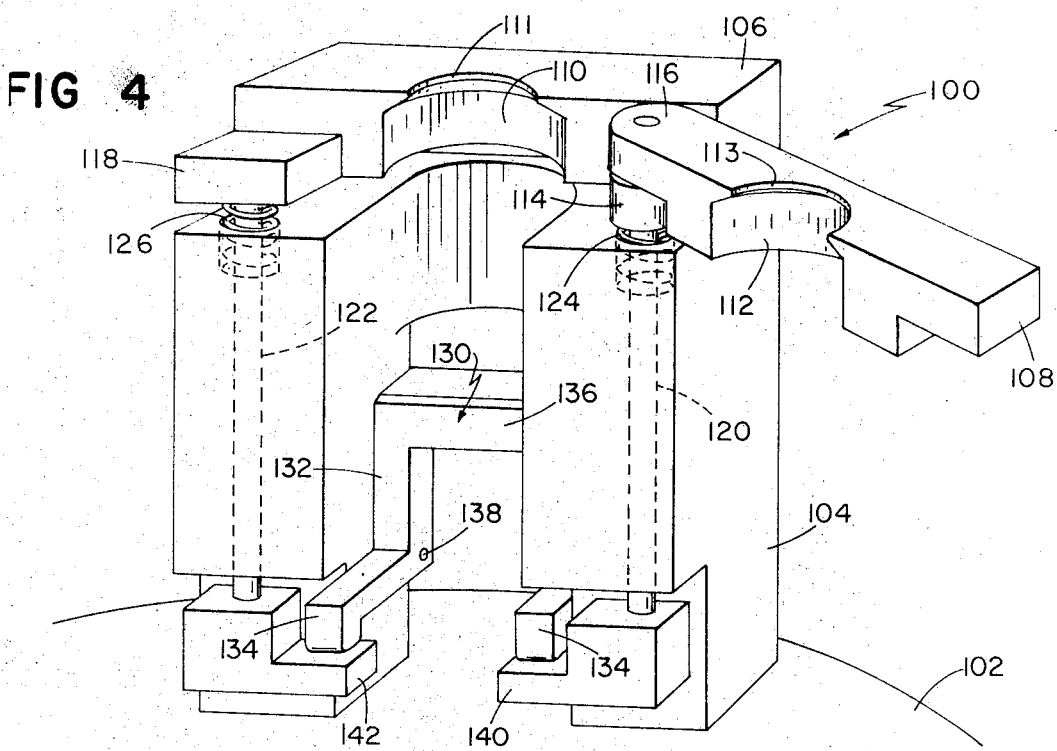

The inner container 10 shown in FIGS. 1 and 2 is intended for use in dispensing devices of the general type shown in Nissen Pat. 3,241,722 and includes a valve assembly 12 secured to and within the mouth of a bottle 14. Valve assembly 12 comprises an upstanding flexible nozzle and core member 16 of ethylene acrylate copolymer, a valve housing 24 molded of an ethylene copolymer having a melt index of 0.3, and a metal outer container upper wall 32. Wall 32 includes an inwardly extending horizontal annular flange 34 at its upper end which overlies an outwardly extending flange 18 at the base of nozzle member 16 and an intermediate portion 36 which is crimped inwardly against the annular wall 26 of valve housing 24. Housing 24 also includes a bottom wall 28 in which an orifice is formed and, depending from bottom wall 28, a generally annular coupling portion 44 to which bottle 14 is secured.

Bottle 14 is of low density polyethylene, permeable to the propellant used in pressurized dispensing devices, such as Freon, and having a melt index of 1.0. The cylindrical wall 50 of bottle 14 is self-suporting, has a main wall thickness of 0.025 inch and at its upper end is provided an annular projection 52 a radially outwardly extending flange 54 and an inwardly extending ridge 56 are provided so that an inner opening of 0.422 inch diameter and a top flange surface of 0.640 inch outer diameter are defined. Coupling 44 has a cooperating radially outwardly projecting ridge 58 of 0.470 inch diameter and an annular recess above ridge 58 of 0.012 inch depth into which the cooperating inwardly projecting ridge 56 on the bottle 14 is snapped. A flange 60 of 0.640 inch diameter extends radially from the bottom wall of the housing and provides a mating positioning stop for the top surface of bottle flange 54.

In assembling inner container 10, bottle 14 is cleaned and then filled with its ingredient, in this particular embodiment hydrogen peroxide; the upper surface of flange 54 of bottle 14 and the lower surface of flange 60 of housing 24 are heated to melting condition; and then the bottle and coupling portion 44 are snapped together so that the molten plastic portions are in engagement and form a seal with bead 62.

Metal container upper wall 32 is then secured across the mouth of an outer container (as in the Nissen patent) in which, in this embodiment, is disposed a soap solution and a reductant selected from the class disclosed in Moses et al. U.S. Pat. No. 3,341,418. A suitable pressure generating propellant, such as halogenated alkane sold under the trade name Freon, a hydrocarbon propellant such as butane, may be introduced into the outer container in liquid phase before the container is sealed or, after the container is sealed, under pressure through the valve assembly.

The pressure of the propellant in the outer container is applied against the flexible wall of the bottle to the ingredient stored therein. If the material of the bottle is pervious to the propellant, the propellant passes through the wall of the bottle slowly so that, after a predetermined interval, the pressure within and without the bottle are the same. When the valve is actuated to dispense a mixture of the two ingredients, the ingredient in the bottle is dispensed, initially by the pressure of the propellant within the bottle and, as propellant is discharged from the bottle and the bottle collapses, by the pressure of the propellant within the outer container against the bottle wall. After discharge, propellant will again pass through the bottle wall and, after a certain interval, the bottle will resume its normal cylindrical form.

Referring now to FIGS. 3 through 9, there is illustrated apparatus for filling bottle 14 with a predetermined amount of hydrogen peroxide and, then, sealing valve assembly 12 and bottle 14 together. The filling and sealing apparatus includes three bottle support assemblies, 100a, 100b, and 100c, mounted on a rotatable table 102, a bottle filling assembly generally designated 150, a valve support assembly generally designated 170, and a heater assembly, generally designated 210. An inner container tester 260 is provided adjacent the filling and sealing apparatus. The entire apparatus, including tester 260, is mounted on a horizontal table 101 and a vertical support wall 103. A positive drive, solenoid-actuated indexer 99 engages fixed table 101 and rotatable table 102. Each time indexer 99 is actuated, it rotates table 102 one hundred twenty degrees (120°), thereby advancing each of bottle supports 100a, 100b, and 100c as required. Manual indexing in modified embodiments is used in place of automatic indexing.

Figure 5:
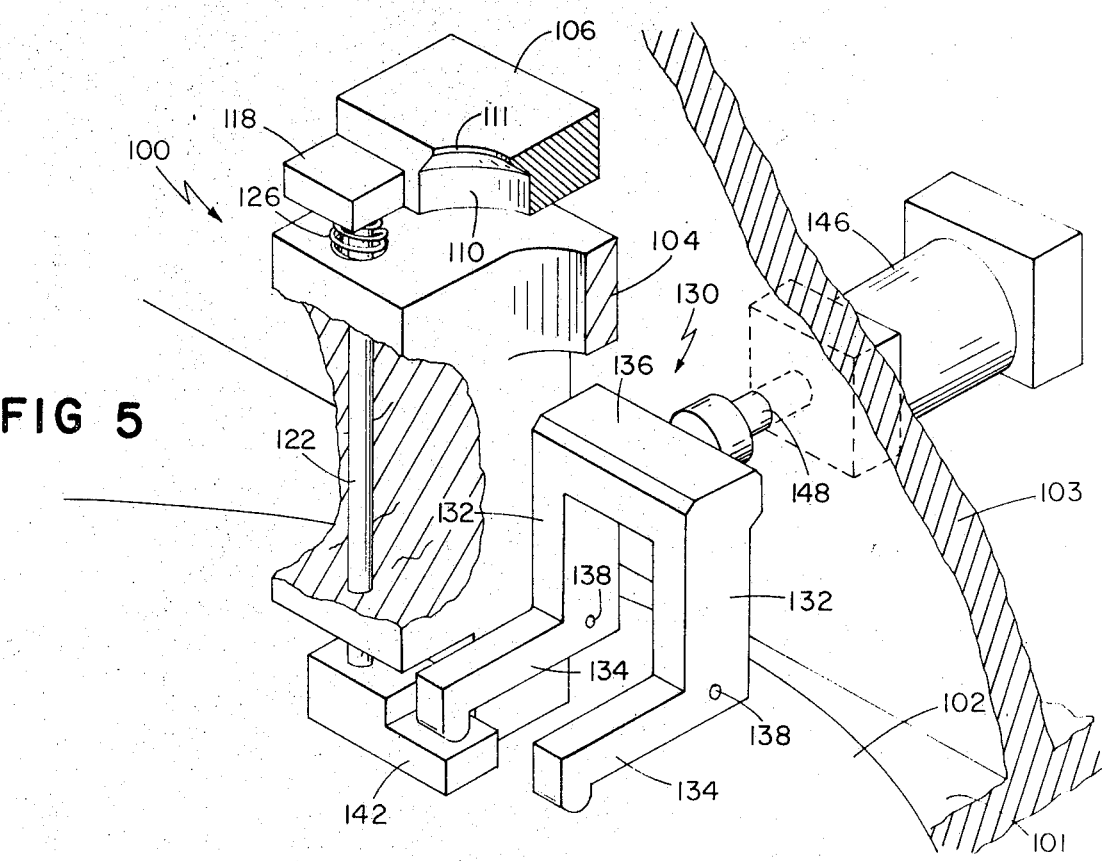

Bottle support assembly 100 is most clearly illustrated in FIGS. 4 and 5 and includes a base member 104, a pair of cooperating bottle supports 106, 108, and apparatus for moving bottle supports 106, 108 vertically relative to base member 104. The adjacent portions of bottle supports 106, 108 include cooperating, substantially semicircular openings 110, 112, respectively, extending therethrough. A thin, inwardly extending flange 111, 113, is provided adjacent the upper surface of each of openings 110, 112. The inside diameter of flanges 111, 113 is substantially equal to the outside diameter of the portion of projection 52 of bottle 14 just below flange 54; the inside diameter of the major portion of openings 110, 112 is slightly greater than the outside diameter of wall 50 of bottle 14.

One end 116 of support 108 is pivotably secured to a flange 114 adjacent one end of support 106.

A second flange 118 is provided adjacent the other end of support 106. Cylindrical rods 120, 122, secured at their upper ends to one of flanges 114, 118, respectively, extends from support 106 downwardly through base member 104. Compression springs 124, 126 encircle the upper portion of each of rods 120, 122. The upper ends of springs 124, 126 bear against the bottom surfaces of flanges 114, 118; the lower ends of the springs are set in recesses in the top of base member 104.

A toggle 130, comprising a pair of L-shaped legs 132, 134 lying in parallel planes and connected at their tops by a cross bar 136, is secured to base 106 for pivotal movement relative thereto by pins 138 at the junction of the upright and base of legs 132, 134. The end of each leg 132, 134 most distant from bar 136 engages a foot 140, 142 mounted on the lower end of rod 120, 122, respectively. An air cylinder 146 and piston 148 are mounted horizontally behind and perpendicular to vertical support wall 103 with the head of piston 148 engaging bar 136 of toggle 130. When cylinder 146 is actuated, piston 148 moves forward to pivot toggle 130 about pins 138 and force supports 106, 108 vertically downward against the force of springs 124, 126.

Referring now to FIG. 3, bottle filling assembly 150 includes a nozzle 152 mounted on support 154 forward of wall 103, a hose 156 of inert material, such as Teflon, extending from nozzle 152 to a filling unit 158 (National Inst. No. KFU-90) mounted behind wall 103, a second hose 160 extending from filling unit 158 to supply container (not shown), and a vertically mounted bottle filling cylinder 162 (Modernair Model No. 89E-RNL1802). The piston of cylinder 162 engages and actuates filling unit 158.

Valve support assembly 170 is most clearly illustrated in FIG. 6 and includes a vertically movable slide 172 secured to the front face of wall 103 by a pair of spaced parallel rails 174, and a cylinder 176 and piston 178 mounted on wall 103 above slide 172 with the axis of movement of piston 178 vertical and the head of piston 178 secured to slide 172. As shown, slide 172 includes a vertical rear plate portion 180 mounted within the channel defined by rails 174 and wall 103, a pair of horizontal cooperating lower valve support plates 182, 184 and an upper valve support member 186 spaced vertically above lower support plates 182, 184.

A compression spring 188 is mounted in a vertical recess in upper support 186 with its lower end extending below the lower horizontal surface 190 of support 186. Each of lower support plates 182, 184 are mounted by pins 185 for pivotal movement in a horizontal plane about the end thereof adjacent vertical plate portion 108. Semicircular recesses 194, 196, having chamfered upper edges, are provided in the adjacent vertical faces 195, 197 of support plates 182, 184, respectively. A toggle spring 192, secured at its ends to pins in support plates 182, 184 provides two stable positions for faces 195 and 197, together so that recesses 194, 196 define a circular opening extending through the support plates, and apart as indicated in FIG. 6. Another circular opening extends perpendicularly through wall 103 between and adjacent the lower end of rails 174. A solenoid 198 is mounted behind wall 103 in position for moving a stop 200 connected to the solenoid core within and through the opening between a first position in which the stop is forward of wall 103 and a second position in which the entire stop is behind the wall.

As shown in FIG. 7, the heater assembly comprises a heater structure 212 including the heating elements and required insulators, a support 214, and a slide actuator cylinder 216 and piston 218. Structure 212 includes a support 230 and, secured to an end surface thereof, two pairs of planar, horizontal, vertically-spaced electric heating elements 220, 222, an intermediate insulator 224 therebetween, and upper and lower insulating sheets 226, 228 mounted respectively on the upper surface of upper heating elements 220 and the lower surface of lower heating elements 222. A circular opening 232 of diameter slightly greater than that of valve assembly coupling portion 44 extends through upper heating element 220 and intermediate insulator 224. Coaxial openings 234 and 236 having diameters, respectively, slightly greater than the outside diameter of flange 60 of valve housing 24 and flange 54 of bottle 14 extend, respectively, through insulator sheets 226 and 228. Cylinder 216 is secured to base 214. The head of piston 218 is secured to support 230 which in turn is mounted for sliding movement along a horizontal guide surface 238 of base 214. When piston 218 is extended, the heating elements of sandwich 212 move horizontally beyond the end 240 of base 214 into position between valve support assembly 170 and the bottle support assembly 100 therebelow with the circular openings in sandwich 212 axially aligned therewith.

Inner container tester 260 (see FIG. 8) comprises an elongated steel block 262 of substantially square transverse cross-section supported at its ends by brackets 264, 266 with the lower surface 263 of block 262 parallel to and spaced above the top of table 101. A cylindrical bore 268 of diameter slightly greater than that of bottle 14 extends longitudinally through block 260. A drilled circular opening 270 extends from the inner peripheral surface of bore 268 downwardly through block 260. A cylinder 272 is mounted below table 101 with its piston 274 extending perpendicularly upwardly through table 101 in axial alignment with opening 270. A button 276 of diameter slightly less than that of opening 270 and with a rounded upper surface is mounted on the head of piston 274. A plexiglass cover 278, having a rectangular opening 280 at one end thereof to provide access to the bore 268 of block 262, is placed over the block and supporting brackets.

Each of cylinders 146, 162, 176, and 216 are connected, through four-way solenoid air valves as will be discussed hereinafter, to a source of air pressure. The piston of each cylinder is normally retracted and extends in response to the activation of its respective solenoid air valve. Tester air cylinder 272 is connected to a source of air pressure through a manually-operated four-way valve.

In practice a bottle 14 is inserted in the bottle support assembly 100a spaced away from wall 103, table 102 rotatably indexed to bring the bottle into position below the nozzle 152 of bottle filling apparatus 150, the filling apparatus actuated to dispense a predetermined amount of hydrogen peroxide into bottle 14, and table 102 again rotatably indexed to move the filled bottle 14 into position below and axially aligned with valve support assembly 170.

Before the filled bottle 14 is moved below valve support assembly 170, a valve assembly 12 is inserted into the valve support assembly with container wall 32 of the valve assembly engaging support plates 182, 184 (and actuating microswitch 356) and the tip of nozzle 16 engaging spring 188. Heating elements 220 and 222 are energized and are heated to different temperatures as required to appropriately soften the flanges 54, 60 of both the bottle and valve assembly in the same period of time.

To heat seal bottle 14 and valve assembly 12 together, bottle 14 is slightly lowered to permit heater sandwich 212 to move between the bottle and valve assembly. The flanges on the bottle and valve assembly are then pressed against the heater elements for the time required to soften them for subsequent sealing, as indicated in FIG. 9. After heating, the flanges are moved away from each other to permit the heater sandwich to move back out from between them, and finally they are snapped together with the softened flanges mating to form a seal. To insure a proper seal, the bottle and valve assembly flanges are pressed against each other so that the total thickness of the flange seal is at least a predetermined amount less than the sum of the thicknesses of the two flanges before heating.

Valve support plates 182, 184 are then opened and the table 102 is rotatably indexed a third time to move the bottle support assembly carrying the sealed inner container-valve unit 10 into its initial position spaced from wall 103, where the unit is removed from the bottle support assembly 100, and a new empty bottle 14 placed therein.

To test the seal between the bottle and valve assembly, the inner container is inserted, bottle end first, into the bore 268 of tester assembly 260. Tester cylinder 272 is actuated, moving the button 276 on piston 274 through opening 270 and against bottle 14 to partially collapse the peripheral wall of the inner container. If the flange seal holds and no liquid escapes through the seal or valve, the inner container is accepted; if not, it is rejected.

Figure 10:
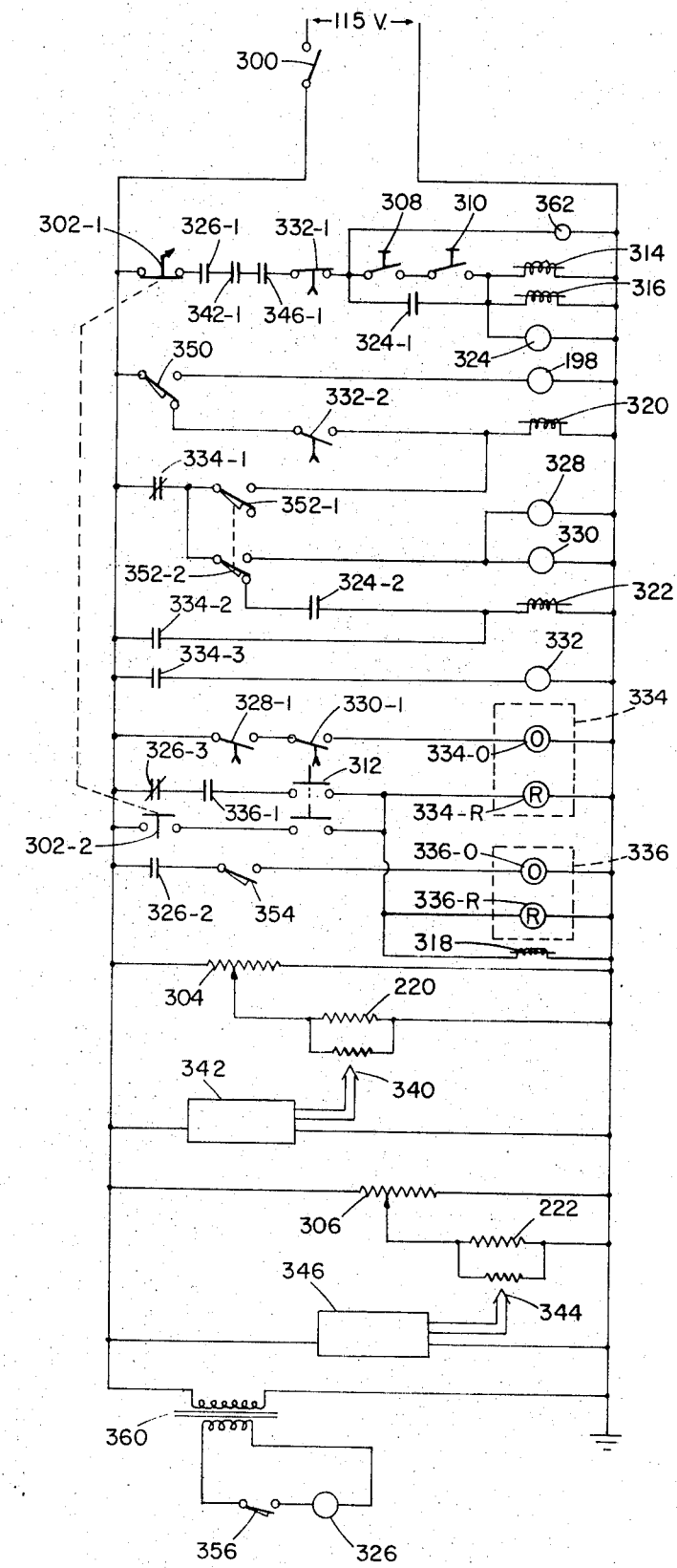
FIG. 10 is a diagrammatic view of the electrical control system of the apparatus of FIG. 3.

Reference is now made to FIG. 10 in which is diagrammatically illustrated the electrical control system which governs the sequential operation of the bottle filling, assembling and sealing apparatus. As shown, the control system includes an SPST disconnect switch 300, a two position selector switch 302, two single phase variable transformers 304, 306, two operator controlled push buttons 308, 310, and a reset push button 312.

This control system also includes a solenoid 314 for operating the automatic fill mechanism 162; a solenoid 316 for actuating the slide cylinder 216 for moving the heaters 220, 222; a solenoid 318 for moving the valve assembly 12 downwardly; and a solenoid 320 for moving the bottle supports 106, 108 downwardly. In addition, the circuit includes two control relays 324, 326; three timing relays 328, 330 and 332; and two latching relays 334, 336, each of which has an operating coil and a reset coil. Connected to variable transformer 304 are a pair of heaters 220 that are connected in parallel the temperature of which is sensed by a thermocouple 340 whose output is applied to a temperature controller 342. Heaters 222, similarly connected to variable transformer 306, are sensed by thermocouple 344 whose output is applied to temperature controller 346. Control switch 350 is actuated in the fully retracted position of slide 212 and switch 352 is actuated in that slide's fully extended position. Switch 354 is actuated by a predetermined amount of downward travel of slide 172.

In operation, when disconnect switch 300 is closed, power is applied to variable transformers 304 and 306 and the primary winding of transformer 360. The heaters 220 and 222 are energized and heated to their preset temperatures as sensed by thermocouples 340 and 344 and as indicated by temperature controllers 342 and 346 respectively. When each heater element reaches its predetermined desired temperature, temperature control interlock switches 342–1 and 346–1 are closed. Clamping a valve assembly 12 in a valve support assembly 170 closes microswitch 356 connected to the secondary of transformer 360 and actuates control relay 326 to close contacts 326–1 and 326–2 and to open normally closed contacts 326–3. As time delay relay contacts 332–1 are normally closed, the enabling circuit which includes selector switch contacts 302–1, valve assembly interlock contacts 326–1, temperature control interlock contacts 342–1 and 346–1, and time delay relay contacts 332–1 is completed, enabling the sequence initiating circuit that includes push buttons 308 and 310. Pilot light 362 is energized at this time indicating readiness of the apparatus for a cycle. When the operator depresses push buttons 308 and 310, a circuit is completed to energize solenoids 314 and 316 and control relay 324. Energization of control relay 324 closes contacts 324–1 to complete a holding circuit so that push buttons 308, 310 may be released. At the same time contacts 324–2 close and solenoid 322 is energized to move the bottle support downwardly away from the path of the heater. Energization of solenoid 314 operates the bottle filling apparatus 162 at the filling station. Energization of solenoid 316 drives the slide 212 at the sealing station on which heaters 220, 222 are mounted outwardly a position below the valve assembly support 170. As soon as slide 212 starts to move, switch 350 changes position to energize solenoid 198 and interpose a travel limiting stop 200 to limit the downward travel of the valve assembly 170. At the forward end of the heater slide movement microswitch 352 is actuated and solenoid 320 is energized through the normally closed contacts 334–1 of latch relay 334 to move the valve assembly support downwardly. Also switch 352–2 opens its circuit to bottle support solenoid 322, releasing that bottle support for upward movement against the heaters 322, and closes a circuit to parallel connected timing relays 328, 330. At this time, the valve assembly is moved down so that flange 60 engages heater element 220 and springs 124, 126 move bottle supports 106, 108 upward so that flange 54 engages heater element 222.

At the end of the timing interval provided by timers 328, 330, typically about 11 seconds, the time delay switches 328–1 and 330–1 close, energizing the operating coil 334–0 of the latching relay 334 to close contacts 334–2 and 334–3 while opening contacts 334–1. With the opening of contacts 334–1, valve assembly solenoid 320 is de-energized to retract piston 178 and move valve assembly 12 upwardly away from the heater sandwich 212. With the closing of contacts 334–2, solenoid 322 is energized to move the bottle support assembly downwardly away from the heater sandwich 212. On closing of contacts 334–3 time delay relay 332 is energized and after a one second delay time delay contacts 332–1 open to release the automatic fill control solenoid 314 and the heater slide solenoid 316, the latter causing the heater slide 212 to retract. As slide 212 starts to move, switch 352 returns to the position shown in FIG. 10 and when the slide returns to its initial position, switch 350 is returned to the position shown in FIG. 10, first de-energizing solenoid 198 to retract stop 200 and then completing a circuit through the now closed time delay contacts 332–2 to energize solenoid 320, driving the valve assembly support 170 down so that the heated surface of flange 60 of valve assembly is forced into firm engagement with the heated surface of flange 54 of the bottle and material is displaced radially to form a bead. A mechanical bond thus is formed so that valve assembly is firmly secured to the bottle. Microswitch 354 is closed by the downward travel of slide 172 as driven by solenoid 320 and air cylinder 176 and (as contacts 326–2 are closed) the operating coil of latch relay 336 is energized to close contacts 336–1.

The operator then opens jaws 182, 184 permitting interlock switch 356 to open and de-energize control relay 326. Contacts 326–1 and 326–2 then open and contacts 326–3 close. The closing of contacts 326–3 completes a circuit to push button 312 and when the operator depresses that push button, both latch relays 334 and 336 are reset, closing contacts 334–1 and opening contacts 334–2, 334–3 and 336–1 and the table 102 is indexed, by actuation of solenoid 318.

Switch 354 provides a safety interlock should the amount of heating of the flange surfaces not be sufficient to permit the predetermined amount of travel of valve assembly support 170 that switch will not be closed. If switch 354 does not close latch relay 336 is not operated and reset does not occur on depression of button 312; thus indicating to the operator the possibility of an inadequate seal.

Should push button 312 not operate to reset the latch relays, the switch 302 may be turned off completing a circuit to contacts 312–2 of push button provide a second reset circuit.

While a particular embodiment of the invention has been shown and described, various modifications thereof will be obvious to those skilled in the art and therefore it is not intended that the invention be limited to the disclosed embodiment or to details thereof and departures may be made therefrom within the spirit and scope of the invention as defined in the claims.

What is claimed is:

1. The method of assembling inner containers for pressurized dispensers of the type in which at least two materials are stored in isolation from each other, said inner containers including a valve assembly housing an outlet and an annular surface surrounding said outlet and a bottle having a flexible peripheral wall and an annular surface defining an opening, said surfaces being adapted for sealing engagement with each other, said method including the steps of:

supporting said bottle in an upright position by engaging a portion thereof intermediate said flexible wall and said annular surface thereof;

filling said bottle with a predetermined amount of one of said materials;

heating each of said surfaces; and moving said surfaces into engagement with each other, said bottle being maintained in an upright position throughout said filling, heating and moving steps.

2. The method of claim 1 wherein each said surface is a flange and including the steps of supporting said valve assembly in an upright position by engaging a portion thereof intermediate said outlet and said flange thereof and axially aligning said flanges of container and said valve assembly prior to heating said flanges.

3. The method of claim 2 wherein said flanges are heated for the same period of time at temperatures corresponding to the melt indices of the flange materials.

4. The method of claim 2 wherein said flanges are moved into engagement with each other and pressed together until the thickness of the engaged flanges is at least a predetermined amount less than the sum of the thicknesses of said flanges before heating.

5. The method of claim 2 including the step of moving a heater intermediate said axially aligned flanges and moving said flanges into engagement with said heater for heating said flanges.

6. The method of claim 5 wherein said heater includes two heating surfaces and one of said flanges is moved into engagement with each of said surfaces, said surfaces being heated to different temperatures and said flanges being held in engagement with said surfaces for the same period of time.

7. The method of claim 6 including the steps of moving said flanges out of engagement with said surfaces and moving said heater from between said flanges prior to moving said flanges into engagement with each other.

8. Apparatus for sealing a valve assembly and a container together, said valve assembly having an outlet and an annular flange spaced from said outlet, and said container including a flexible peripheral wall and an annular flange spaced from said wall, said flanges being adapted for sealing engagement with each other, said apparatus comprising:

a valve support structure for engaging said valve assembly intermediate said outlet and said flange thereof;

a container support structure for engaging said container intermediate said flexible wall and said flange thereof and supporting said container in an upright position;

a heater having a first surface adapted for engaging said flange of said valve assembly and a second surface adapted for engaging said flange of said container;

said valve support structure and said container support structure being spaced-apart and relatively movable towards and away from each other and said heater having a first position intermediate said structures and a second position spaced from said first position; and, control apparatus including a control circuit and operative for successively moving said valve and bottle support structures relatively towards each other into a heating position in which said flanges will engage said heater, then moving said heater into said second position, and moving said valve and bottle support structures relatively towards each other into a sealing position in which said flange portions will engage each other.

9. The apparatus of claim 8 wherein said control circuit is operative for moving said heater into said first position prior to moving said valve and bottle support structures into said heating position.

10. The apparatus of claim 8 including a container filling structure for discharging a predetermined amount of a fluid into said container and wherein said container support structure is mounted on a movable support, said support being movable from a first position wherein said container support structure is adjacent said filling structure to a second position wherein said container support structure is adjacent said valve support structure.

11. The apparatus of claim 10 wherein said support is movable from said second position to a third position wherein said container support structure is spaced from said valve support and filling structures.

12. The apparatus of claim 11 wherein said control circuit is operative for moving said support subsequent to movement of said valve and bottle support structures into said sealing position.

13. The apparatus of claim 11 wherein at least three container support structures are mounted on said movable support.

14. The apparatus of claim 8 wherein said control circuit is operative for moving said valve and bottle support structures relatively apart from said heating position prior to movement of said heater into said second position.

15. The apparatus of claim 8 wherein said control circuit is operative for moving said valve and bottle support structures relatively towards each other into a sealing position in which said flanges will engage each other and the total thickness of said engaged flanges is at least a predetermined distance less than the sum of the thicknesses of said flanges before heating.

16. The apparatus of claim 8 wherein said control circuit is operative for controlling the temperature of said surfaces of said heaters and maintains said first surface at a different temperature than said second surface.

17. The apparatus of claim 16 wherein said control circuit is operative for preventing movement of said valve and container support structures into said sealing position prior to heating said surfaces to predetermined temperatures.

18. The apparatus of claim 8 wherein said control apparatus is operative for preventing movement of said valve and container support structure into said heating position prior to placement of a valve assembly in position engaging said valve support structure.

19. The apparatus of claim 8 wherein said container support structure is mounted on a movable support, said support being movable from a first position wherein said container support structure is adjacent said valve support structure to a second position wherein said container support structure is spaced from said valve support structure and said control circuit is operative for moving said support from said first position to said second position subsequent to movement of said valve and container support structures into said sealing position.

20. The apparatus of claim 19 wherein said control circuit moves said support from said first to said second position a predetermined time interval after movement of said valve and container support structures into said sealing position.

21. The apparatus of claim 19 wherein said control circuit is operative for moving said valve and bottle support structures relatively towards each other onto a sealing position in which said flanges will engage each other and the total thickness of said engaged flanges is at least a predetermined distance less than the sum of the thicknesses of said flanges before heating, and wherein said control system prevents movement of said support from said first position to said second position.

References Cited
UNITED STATES PATENTS

| | | | |
|---|---|---|---|
| 3,119,216 | 1/1964 | Held | 53—39 |
| 3,309,836 | 3/1967 | Hallowell | 53—282X |

TRAVIS S. McGEHEE, Primary Examiner

U.S. Cl. X.R.
53—39, 282, 329